United States Patent [19]

Lynch

[11] 4,288,191
[45] Sep. 8, 1981

[54] HAY BALE HANDLING MECHANISM

[75] Inventor: Bobby R. Lynch, Ozark, Mo.

[73] Assignee: Tri-L Manufacturing, Inc., Ozark, Mo.

[21] Appl. No.: 81,468

[22] Filed: Oct. 3, 1979

[51] Int. Cl.³ .............................................. B66F 11/00
[52] U.S. Cl. .................. 414/24.5; 414/720; 414/911
[58] Field of Search ................. 414/24.5, 24.6, 684, 414/685, 719, 720, 911, 557; 267/47, 48, 160

[56] References Cited

U.S. PATENT DOCUMENTS

| 4,090,616 | 5/1978 | Runyan et al. | 414/24.5 |
| 4,154,349 | 5/1979 | Christensen | 414/685 |
| 4,179,034 | 12/1979 | Antwerp et al. | 414/911 |

FOREIGN PATENT DOCUMENTS 1063979  10/1979  Canada ................. 414/24.5

OTHER PUBLICATIONS

Affidavit by John P. Jones, filed 11/12/76 with attached sales pamphlet from Gold'n Industries.

Primary Examiner—Joseph E. Valenza
Attorney, Agent, or Firm—E. J. Holler

[57] ABSTRACT

A vehicle-mounted carrier and dispenser for a cylindrical hay bale of substantial size and weight. An elongated finger-support member is pivotally mounted on the bed of a pick-up truck, a tractor hitch or other vehicle. The finger support member is T-shaped to retain a plurality of support fingers in cantilevered relation to penetrate and engage the bale. The finger support member is attached to a base member which is mounted on the truck bed. A power winch is located on said base member having a cable connected to the free end of the central arm member of the T-shaped finger support member. Tensioning means comprising a pair of aligned leaf springs is mounted between said pivotal finger support member and said fixed base member to allow continuous tension on the cable and thus prevent any loose unwinding or unraveling of the cable on the power winch. The leaf springs further function to assist positive control of pivotal movement of the finger support member between its lowered and raised positions, both when loaded and unloaded.

13 Claims, 5 Drawing Figures

HAY BALE HANDLING MECHANISM

BACKGROUND OF THE INVENTION

1. Field of the Invention

The present invention relates to handling cylindrical bales and more particularly to a hay bale carrier and dispenser or feeder.

2. Description of Prior Art

The handling of large, heavy hay bales has presented a serious problem for farmers, cattlemen and others growing and feeding hay in large quantities, and this particular problem has been intensified by the recent introduction of farming machinery which commonly produces a large, very heavy cylindrical hay bale. The prior art devices have not fully solved the problem of handling such heavy bales in a simple and economical manner.

Lift trucks for moving bulky, heavy loads are known in the art as disclosed by U.S. Pat. No. 2,684,164 to Violette, and U.S. Pat. No. 2,698,698 to Smith et al. A mechanism for lifting carpet rolls is known as disclosed by U.S. Pat. No. 3,705,658 to Harris, and a load handling and engaging device for lift trucks for handling bulk materials is disclosed by U.S. Pat. No. 2,682,350 to Garrett.

The handling of large, round hay bales, which frequently weigh as much as 1 to 1½ tons, and measure from about 5 to 8 feet in length and diameter, has continued to present serious problems. The efficient movement of such bales for storage and feeding purposes has previously required relatively expensive hydraulic equipment.

U.S. Pat. Nos. 4,015,739 to Cox and 4,120,405 to Jones both relate to mechanisms which involve hydraulically-powered means which are attached to tractors for spear-type bale pick-up devices. In either case, such mechanisms may be attached to pick-up trucks, but require hydraulic power sources.

Other types of apparatus have involved combined bale lifting, hauling and unrolling mechanisms such as disclosed by U.S. Pat. No. 4,084,708 to Goodvin. In this disclosure, the bale lifter and carrier attachment is raised by an electric winch, but the flexible cable frequently becomes snarled and unmanageable. The hay bale handling mechanism disclosed by U.S. Pat. No. 4,015,739 to Cox requires a hydraulic cylinder to effect upward and downward motion of a single bale-supporting elongated finger.

All of the prior art winch devices have a common problem of lowering the empty finger(s) or spike(s) from their vertical position to a horizontal position for bale penetration. With the empty finger(s) projecting upwardly, and the finger support member resting in the bed of the vehicle, most of the weight resides over the bed. When the winch is unwound, there are no forces to push the finger(s) around the pivot point for projecting into horizontal loading position. Normally, the operator is required to unwind the winch cable, then walk around and physically pull the finger(s) downwardly into horizontal loading position, frequently experiencing cable snarling. Problems of unwinding sufficient cable are obvious. If insufficient cable is unwound, the operator must repeat the unwind and walk around again to pull the finger(s) downwardly. The present invention eliminates such problems.

SUMMARY OF THE INVENTION

The bale handling mechanism of this invention involves an apparatus, which can be rigidly attached to the bed of a pick-up truck or other vehicle, having a plurality of elongated fingers extending rearwardly in horizontal or pick-up position to an upwardly extending relation in its vertical load-carrying position. The bale can be loaded onto the projecting fingers of the support member by backing the truck or other vehicle towards the bale with the elongated fingers penetrating the bale through its axial center, or through the horizontal plane of its axial center, and then pivoting the finger support member upwardly for movement of the bale. The bale is then raised by elevating the elongated load-carrying fingers. The bale is retained by the array of support fingers then pointing upwardly for positive bale retention. When unloading is desired, the bale is lowered to rest on a supporting surface, or the ground, and the vehicle is moved away withdrawing the fingers from the bale.

The bale handling apparatus mounted on the truck is operated by an electric winch, or a hydraulic winch, while the pivotal finger support member and the stationary base member have positive tensioning means mounted therebetween operating on the flexible lift cable. The tensioning means preferably consist of a pair of contoured leaf springs interposed between the base member and the pivotal finger support member which assist in maintaining continuous tension on the lift cable at all times. In the moving or transport position, the support fingers are pivoted forwardly and upwardly to a near vertical position thereby positively maintaining the bale in stationary transport relation within the truck bed sides where it is centrally located. The bed sides serve to further support and retain the bale. When the bale is to be unloaded, it is only necessary to operate the electric winch or hydraulic winch to move the fingers to the horizontal rearwardly extending position whereby the bale is placed on the ground. The truck is free to drive away, leaving the bale behind. The tensioning means consisting of a pair of aligned contacting leaf springs provides apparatus for assisting in maintaining continuous tension on the flexible lifting cable at all times, thus preventing problems of snarled cable during loading and unloading, and periods therebetween, especially when the empty fingers are to be lowered for use. Thus, the apparatus is ready for immediate use at all times.

It is a primary object of the present invention to provide combined apparatus which is fully capable of performing the aforesaid functions in an expedient and economical manner. With a flexible lifting cable connected to the finger support member, the leaf springs are adapted to maintain positive tension on the cable for positive control of the lifting fingers, when moved in both upward and downward directions, as well as when the fingers are unloaded or loaded.

Further objects are readily attainable as set forth more fully hereinafter, and as illustrated in the accompanying drawings.

BRIEF DESCRIPTION OF THE DRAWINGS ON THE DRAWINGS

DESCRIPTION OF PREFERRED EMBODIMENT

Figure 1:
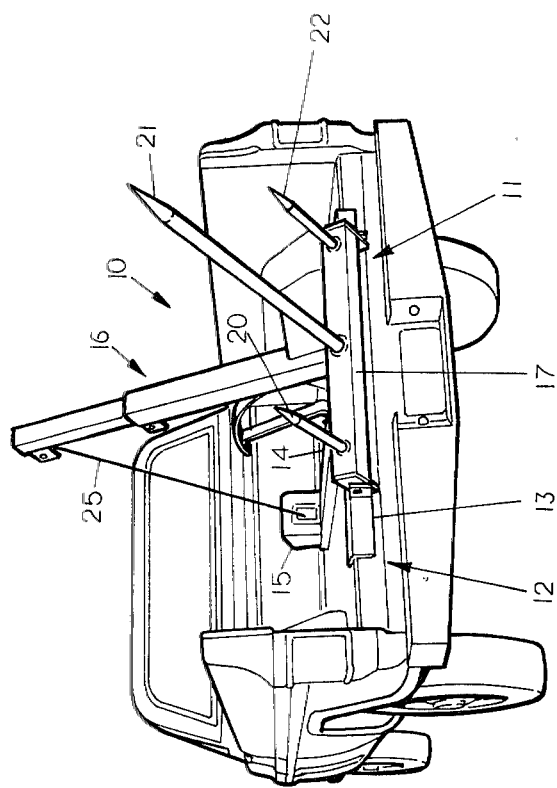
FIG. 1 is a perspective view of the hay bale handling mechanism mounted on a pick-up truck.
Figure 5:
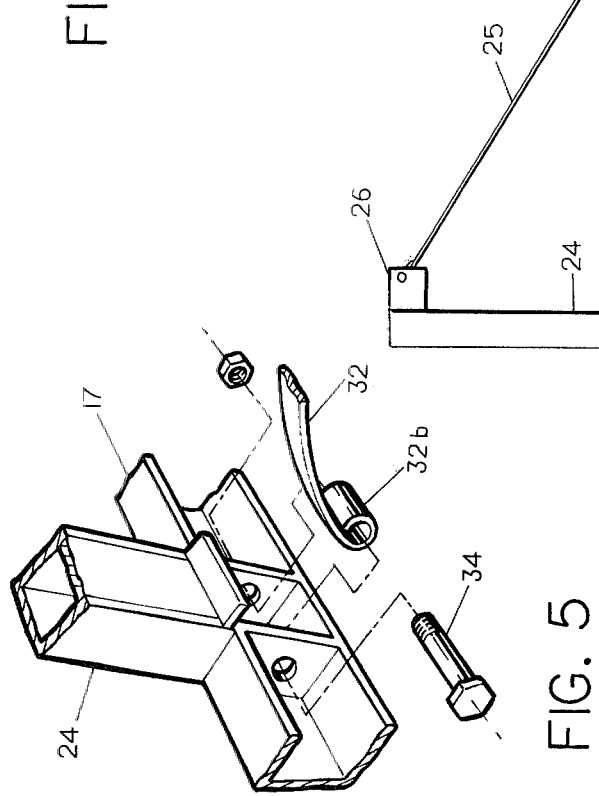
FIG. 5 is a further enlarged fragmentary perspective view of the mounting means for one leaf spring.
Figure 2:
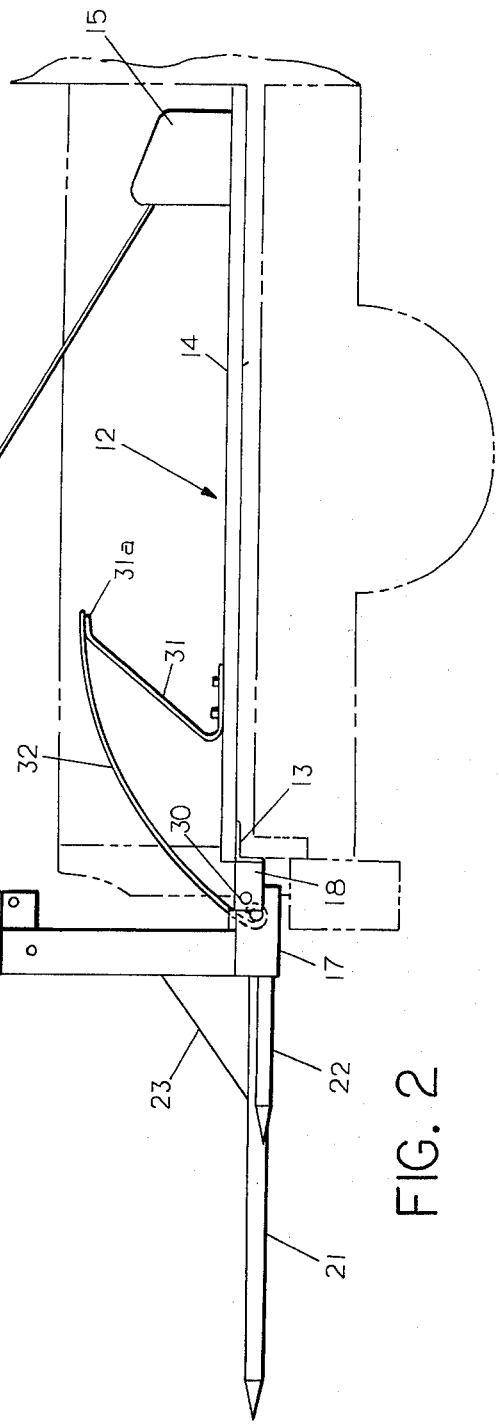
FIG. 2 is a schematic side elevational view of the bale handling mechanism in lowered position.

The bale handling mechanism of this invention for use on pick-up trucks is referred to generally in FIG. 1 by the reference numeral 10. The mechanism is provided with an elongated finger support member 11 which is pivotally mounted on a base frame assembly 12. The bale member is preferably T-shaped and mounted with a rearward cross-member portion 13 located adjacent the rearward end of the truck bed. The cross-member 13 may be comprised of an angle iron fitted over the rear edge of the truck bed. An electric winch 15 is mounted on a forward portion of the base member adapted to pivotally raise and lower the finger support member 11. Alternately, a hydraulically-operated winch may be employed to operate the cable to move the finger support member.

As stated, the base member 12 is preferably T-shaped in cross-section with its central member 14 located in the center of the truck bed with its cross-member 13 near the rearward extremity of the truck bed. The cross-member is rigidly mounted on the truck bed in permanent relation on the flat plane of the bed. Bolts may be employed for securing the base member to the floor of the pick-up truck, or alternately, it may be welded thereto.

The finger support member 16 is T-shaped in cross-section and includes a cross-member 17 which is pivotally mounted to the cross-member 13 of the base assembly 12. The base cross member 13 has a slightly greater length than the cross-member 17 of the finger support structure. The cross-member 17 is pivotally mounted on the base cross-member 13 on a pair of suitable pin members journaled within pairs of lugs 18 attached to the base cross-member and projecting rearwardly.

The cross-member 17 of the finger support structure 16 is employed to support a plurality of three elongated finger members 20, 21 and 22 disposed in horizontal lineal array when lowered. The central finger 21 is substantially longer than the next adjacent outer pair of fingers 20 and 22 having similar shorter lengths. The elongated cantilevered fingers having relatively pointed free-end portions are adapted to penetrate the bale when the truck is backed into close proximity with the bale located on the ground or other surface. Central longer finger 21 has a triangular gusset plate 23 attached to the central arm member 24 of the pivotal finger support structure 16 to provide additional lifting strength to this longer projecting finger or spike. The fingers are aligned in a single plane, preferably horizontally when lowered, to penetrate the bale and facilitate its lifting and transport without rotation, even if off-center.

Finger support member 16 which is T-shaped and movable about pivot point 30 has a central arm member 24 which extends in lineal alignment with base central member 14. The free end of flexible lifting cable 25 is firmly attached to the projecting free end of arm member 24 at a block 26. A stop member 27 may be attached to a medial region of central arm member 24, if desired. Central arm member 24 extends vertically when fingers 20, 21 and 22 extend horizontally, these several elements being in right-angle relation on finger support member 16.

Figure 3:
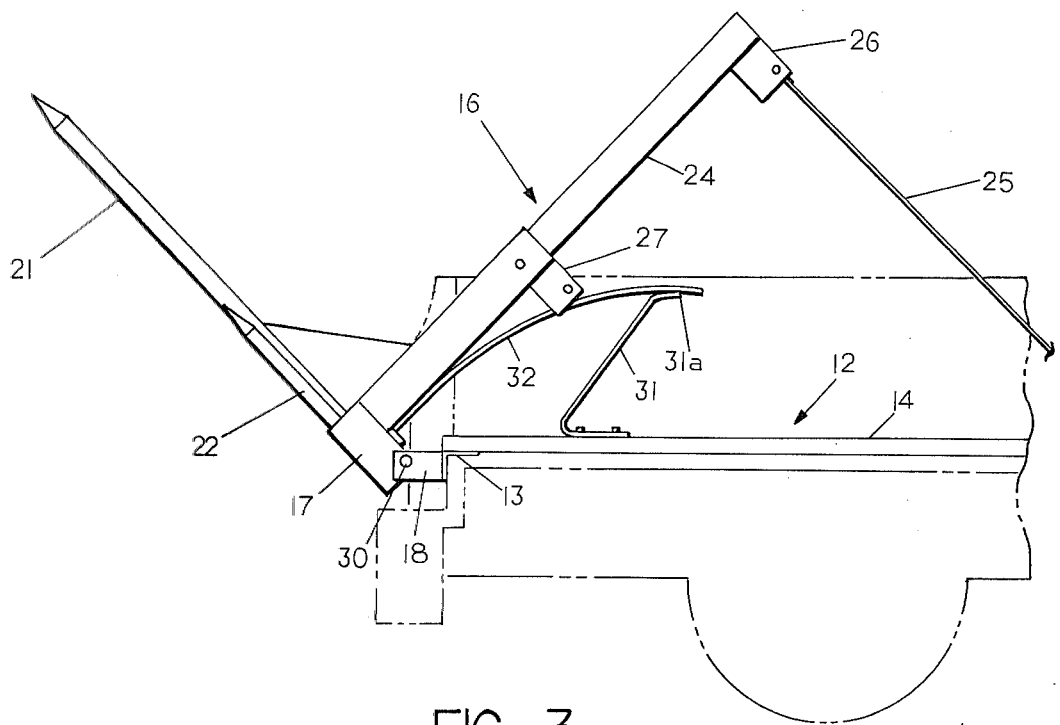
FIG. 3 is a view similar to FIG. 2 showing the bale handling mechanism in partially raised position.
Figure 4:
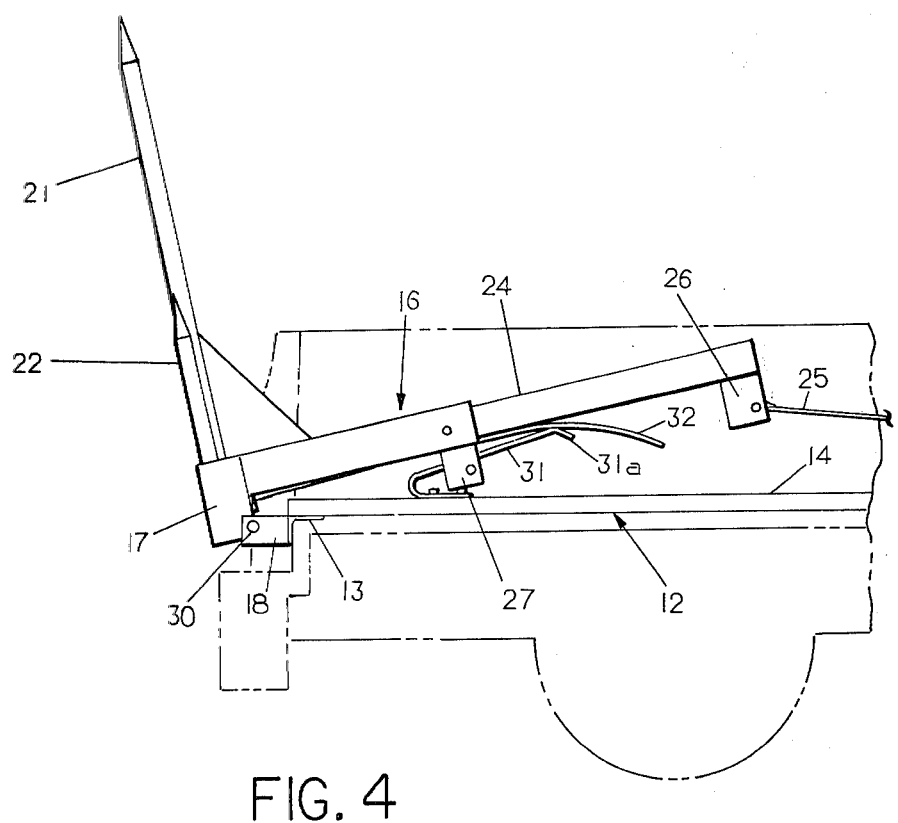
FIG. 4 is a view similar to FIGS. 2 and 3 showing the bale handling mechanism in nearly fully raised position.

A pair of leaf springs 31 and 32 is mounted in lineal alignment between central arm members 14 and 24 of the base assembly and finger support member, respectively. Leaf spring 31 has one end permanently fastened to the central member 14 of the base assembly and is doubled back on itself with its free end projecting upwardly and forwardly. Its free end has an angled flattened portion 31a adapted to contact the other leaf spring 32. Spring 32 is mounted having one end within a suitable channel at the lower end of central arm member 24 adjacent its pivot point 30. Spring 32 is arcuately curved with its free end projecting forwardly to be contacted on its underside by the flattened end portion 31a of spring 31. The two springs 31 and 32, in combination with the weight of T-shaped finger support, are able to maintain continuous tension on the flexible cable 25 between loads and during all times when loading and unloading the bale. The springs, each having one end attached and the other freely cantilevered, are maintained in sliding contact when the fingers are raised as shown in FIGS. 3 and 4. The finger support member 16 can be raised to a near vertical position as shown in FIG. 4 to where optional stop member 27 makes contact with the supported end of spring 31 on the truck bed. At this time, the lifting cable 25 is maintaining a direct pull on arm member 24 in nearly an axial direction. Leaf spring 32 has its attached end portion 32b located within a suitable channel at the lower end of central arm member 24. The spring may have a circular end portion mounted on a suitable pivot pin 34. Such mounting assists in keeping the two leaf springs in coaxial contacting alignment for developing the continuous tension. The two leaf springs are so contoured that, in combination with the weight of the T-shaped finger support member, they are able to exert positive and continuous tension on the flexible lifting cable, whether the lifting fingers are loaded or unloaded, and when moved both upwardly and downwardly.

In operation, the truck is driven to the location of the bale and the elongated finger support member 16 is pivotally lowered to a rearwardly and horizontally-extending position where the pointed end of finger 21 is positioned on the axial center of the hay bale. No difficulty is experienced in lowering the fingers with the continuous tension on the lifting cable. The truck is then backed further towards the bale permitting the fingers to penetrate the bale until it engages the cross-member 17. The winch 15 is then operated to raise fingers 20, 21 and 22 by pivotal movement of finger support member 16. The bale may then be transported supported by the fingers and the truck bed sides. When it is desired to unload the bale after transport, the winch is again operated to lower finger support member 16 so that the bale again contacts the ground or other surface. The truck may then be driven away leaving the bale in place. The finger support member 16 may be readily raised and subsequently again lowered with full control over the support cable and finger elevation due to the continuously maintained tension.

Various modifications may be resorted to within the spirit and scope of the appended claims.

I claim:

1. A bale handling mechanism adapted to mounting on the bed portion of a pick-up truck or the like comprising a base member for attachment to said truck bed portion, a T-shaped finger support member comprising a cross-member and a central member, one end of said central member being secured to said cross-member and extending transversely from said cross-member and the opposite end thereof being free, said cross-member being pivotally mounted on said base member adjacent the rearward end of said base member and said truck bed portion for pivotal movement between a lowered position in which said central member extends upwardly from said cross-member and a raised position in which said central member extends forwardly above said base member and said truck bed portion, a plurality of elongated finger members attached to and projecting rearwardly from said pivotally-mounted cross-member in its lowered position and adapted to penetrate and support the bale, cable means connected to the free end portion of the central member of said T-shaped finger support member, winch means mounted on said base member spaced from said pivotal T-shaped finger support member and connected to the other end of said cable means and adapted to raise said bale, spring means mounted in lineal alignment between the said pivotal T-shaped finger support member and said base member and adapted to maintain continuous tension on said cable means, said spring means comprising a pair of leaf springs, one of said leaf springs having one end thereof attached to said base member and extending upwardly from said base member, the end opposite said one end being free and being flattened, and the other of said leaf springs having one end thereof attached to said T-shaped finger support member and extending from said T-shaped finger suppport member upwardly and forwardly in an arcuate configuration such that the underside thereof contacts said flattened end portion of said leaf spring when said T-shaped finger support member is in said lowered position, whereby as said T-shaped finger support member is moved by said winch means from said lowered position to said raised position the underside of said other leaf spring is caused to slide forwardly over said flattened end of said one leaf spring, said one leaf spring is pressed downwardly in the forward direction by said other leaf spring and said other leaf spring is compressed towards a less arcuate configuration by said one leaf spring.

2. The bale handling mechanism set forth in claim 1, wherein said leaf spring means comprises a pair of leaf leaf springs mounted in lineal alignment with the central member of said pivotal T-shaped finger support member.

3. The bale handling mechanism set forth in claim 2, including a hollow channel portion in the central member of said T-shaped finger support member adjacent to said base member to retain said other arcuately-shaped leaf spring in lineal sliding alignment with the one leaf spring during pivotal movement of said finger support member between its lowered and raised positions.

4. The bale handling mechanism set forth in claim 1, wherein said winch means comprises a cable drum and electric motor adapted to operate said cable drum.

5. The bale handling mechanism set forth in claim 1, wherein said pivotally-mounted T-shaped finger support member is adapted to operate through essentially a right-angle between its lowered and raised positions.

6. The bale handling mechanism set forth in claim 1, wherein said plurality of elongated finger members comprises at least three bale-penetrating fingers mounted in horizontal parallel array in said lowered position.

7. The bale handling mechanism set forth in claim 1 wherein said cable means comprises a flexible steel cable connected to the central arm member of said T-shaped finger support member and said winch means mounted on said base member.

8. The bale handling mechanism set forth in claim 1, wherein said other arcuate leaf spring has a guadrantal curved shape to encompass substantially a 90° quadrant.

9. A hay bale handling mechanism adapted to rigid mounting on the bed portion of a pick-up truck or the like comprising a base member for attachment to said truck bed portion, a T-shaped finger support member comprising a cross-member and a central member, one end of said central member being secured to said cross-member and extending transversely from said cross-member and the opposite end thereof being free, said cross-member being pivotally mounted on said base member adjacent the rearward end of said base member and said truck bed portion for pivotal movement between a lowered position in which said central member extends upwardly from said cross-member and a raised position in which said central member extends forwardly above said base member and said truck bed portion, a plurality of elongated finger members attached to and projecting rearwardly from the said pivotally-mounted cross-member in its lowered position and said truck bed portion and adapted to penetrate and support the bale, cable means connecting the free end portion of the central member of said T-shaped finger support member and a forward portion of said base member, an electrically-powered winch mounted on the forward portion of said base member and having a cable drum adapted to retain the operative end of said cable means, a pair of leaf springs to combinedly allow continuous tension on said cable means for its uniform retention on and release from said cable drum, one of said leaf springs having one end thereof attached to said base member and extending upwardly from said base member, the end opposite said one end being free and flattened, and the other of said leaf springs having one end thereof attached to said T-shaped finger support member and extending from said T-shaped finger support member upwardly and forwardly in an arcuate configuration such that the underside thereof contacts said flattened end portion of said one leaf spring when said T-shaped finger support member is in said lowered position, and an electrical power source adapted to operate said winch, whereby as said T-shaped finger support member is moved by said winch from said lowered position to said raised position the underside of said other leaf spring is caused to slide forwardly over said flattened end of said one leaf spring, said one leaf spring is pressed downwardly in the forwardly direction by said other leaf spring and said other leaf spring is compressed towards a less arcuate configuration by said one leaf spring.

10. A hay bale handling mechanism set forth in claim 9, wherein said plurality of elongated finger members are attached to said pivotally-mounted cross-member extending perpendicularly to the central member of said T-shaped finger support member.

11. A hay bale handling mechanism set forth in claim 9, wherein said pair of leaf springs have complemental widths and are mounted in lineal alignment for slidable engaging contact while allowing continuous tension on said cable means.

12. A hay bale handling mechanism set forth in claim 9, wherein said cable means comprises a flexible steel cable adapted to being positively controlled when tightly wound on and released from said cable drum.

13. A hay bale handling mechanism set forth in claim 9, wherein said other arcuately-shaped leaf spring has a quadrantal curved shape to facilitate positive movement of said plurality of elongated finger members through essentially a right-angle from lowered to raised positions while said one leaf spring is maintained in contact with said other leaf spring during enough of the quadrant to maintain cable tension.

* * * * *